(12) United States Patent  
Stefanik et al.

(10) Patent No.: US 7,664,679 B2  
(45) Date of Patent: Feb. 16, 2010

(54) METHOD AND A SYSTEM FOR COMPUTER SOFTWARE DISTRIBUTION USING NETWORKED SOFTWARE DISPENSING VENDING MACHINES

(75) Inventors: Steve Stefanik, San Jose, CA (US); Maurice Sharp, Cupertino, CA (US)

(73) Assignee: PalmSource Inc., Sunnyvale, CA (US)

( * ) Notice: Subject to any disclaimer, the term of this patent is extended or adjusted under 35 U.S.C. 154(b) by 459 days.

(21) Appl. No.: 11/257,767

(22) Filed: Oct. 25, 2005

(65) Prior Publication Data

US 2006/0212360 A1     Sep. 21, 2006

Related U.S. Application Data

(63) Continuation of application No. 10/087,370, filed on Feb. 28, 2002, now Pat. No. 6,959,285.

(51) Int. Cl.  
*G06Q 30/00*     (2006.01)
(52) U.S. Cl. .......................... 705/26; 705/37
(58) Field of Classification Search ................... 705/26, 705/37  
See application file for complete search history.

(56) References Cited

U.S. PATENT DOCUMENTS

2002/0069308 A1*   6/2002   Jones et al. ................... 710/5

OTHER PUBLICATIONS

Mach One Corp. completes LaserVend merger, Thomas, William. Business Wire. New York: Nov. 25, 1996. downloaded fro ProQuest Direct on the Internet on Aug. 31, 2009, 3 pages.*

* cited by examiner

*Primary Examiner*—James Zurita  
(74) *Attorney, Agent, or Firm*—Barry & Associates P.C.

(57) ABSTRACT

A method and a system for dispensing software programs from a networked software dispensing kiosk device or ATM. Software developers can place software for sale within the network thereby causing various remote software ATMs to offer the software. The user causes a display of a list of different categories of software titles available through a remotely located software ATM, e.g., located in a retail market place, or other public place. The user makes a selection from the list and may optionally execute the selected software using an on-screen emulation of the user's device. If the user is satisfied with the execution of the selected software, the user can purchase or rent the selected software using automated vending equipment of the software ATM. Purchased or rented software titles are electronically communicated from the software ATM to the user's portable computer system. The software ATM can also provide backup and archiving services for a portable computer user.

19 Claims, 9 Drawing Sheets

| BASKETBALL | GAMES | STOCKS |
|---|---|---|
| LAKERS V JAZZ | SOLITAIRE | ABC |
| JAZZ V CELTICS | HEARTS | XYZ |
| APPLICATION3 | BRIDGE | AMC |
| APPLICATION4 | CHESS | PALM |
| APPLICATION5 | APPLICATION5 | 3-COM |
| APPLICATION6 | APPLICATION6 | APPLICATION6 |
| APPLICATION7 | APPLICATION7 | APPLICATION7 |
| APPLICATION8 | APPLICATION8 | APPLICATION8 |
| 410 | 420 | 430 |

USER'S INACTIVE LIST

GAME (CHESS)

STOCK (XYZ, ACM ETC.)

NEW YORK MAP

PARIS MAP

SAN FRANCISCO MAP

LAKERS BASKETBALL

49RS FOOTBALL

CAR EXPENSES YTD

| BASKETBALL | | GAMES | | STOCKS | |
|---|---|---|---|---|---|
| APPLICATION1 | * * * | APPLICATION1 | * * | APPLICATION1 | * * |
| APPLICATION2 | * * * | APPLICAITON2 | * * * | APPLICAITON2 | * * * |
| APPLICATION3 | * * | APPLICATION3 | * * | APPLICATION3 | * * |
| APPLICATION4 | * | APPLICATION4 | * | APPLICATION4 | * |
| APPLICATION5 | * * * | APPLICATION5 | * * * | APPLICATION5 | * |
| APPLICATION6 | * * * * | APPLICATION6 | * * | APPLICATION6 | * * |
| APPLICATION7 | * * * | APPLICATION7 | * * * | APPLICATION7 | * * * |
| APPLICATION8 | | APPLICATION8 | * | APPLICATION8 | * |

FIGURE 9

METHOD AND A SYSTEM FOR COMPUTER SOFTWARE DISTRIBUTION USING NETWORKED SOFTWARE DISPENSING VENDING MACHINES

CROSS REFERENCE TO RELATED APPLICATIONS

This application is a continuation application of application Ser. No. 10/087,370, entitled "A Method And A System For Computer Software Distribution Using Networked Software Dispensing Vending Machines," filed Feb. 28, 2002, to be issued as U.S. Pat. No. 6,959,285, and assigned to the assignee of the present application. The subject matter in the above-identified co-pending and commonly owned application is incorporated herein by reference.

BACKGROUND OF THE INVENTION

1. Field of the Invention

Embodiments of the present invention relate to the field of computer software applications and services. More specifically, embodiments of the present invention relate to the field of computer software distribution and distribution of computer system services.

2. Related Art

The number of software applications used by a typical user of a computer system has rapidly increased over the past few decades. The increase in software applications among owners of portable computers has also increased to the point where owners of personal digital assistants (PDAs) maintain a library of computer software programs at their disposal.

The available distribution channels for software dictate, more than any other factor, the availability of software for computer users. In other words, the software channels available today, not the software developers, dictate the availability of software for end users. This is the result because in most cases, the software developer has no direct outlet to end users, but rather must use some form of software distribution channel. For various economic reasons, as described below, most software distribution channels restrict the number of software titles that are available to end users.

Moreover, software titles for PDAs sell better at lower prices. The retail prices of many software application programs for desktop computer systems are less than the cost of the desktop computer system, but exceed the price of many PDAs. Therefore, a cost effective price point for software applications targeted for PDAs should be in a range that is substantially less than the cost of the PDA itself. For instance, someone that purchases a PDA in the range of $100.00 to $300.00 may not be motivated to purchase a software application for $150.00 (or more), but may acquire several applications in the low cost range of $5.00-$25.00. Unfortunately, software distribution channels do not readily exist today for distributing large amounts of software titles within this low cost range. In other words, the ratio of the price of the software compared to the price of the PDA is often a determining factor in deciding whether to purchase a software title.

Software titles are primarily distributed today using three software channels: Internet retail, in-store retail and bundled with hardware. Neither of these distribution channels offers a reasonable avenue for distributing large amounts of software titles in the low cost range.

Regarding the in-store retail distribution channel, retail outlets provide software applications to customers who can directly visit a store and purchase the software product in a physical medium. However, this distribution channel introduces a number of substantial overhead costs which need to be passed on to the consumer thereby raising the minimum price of the software. For instance, distribution of software through retail stores entails expenses related to packaging the products, transporting the products, storing the products, reserving shelf space for the products and paying wholesaler and retailer profits. These costs, and middlemen profits, often translate into a few hundred percent mark-up for software titles while also requiring a high minimum product price. Also, because limited shelf space must be reserved for software titles, this reduces the number of software titles that any one store can provide. Developers of low cost software cannot easily compete for shelf space in retail stores, and if they could, the prices charged by retail outlets would be too large to move the products and finally the bulk of any profits would go to the retail stores, not the software developers.

Yet, another retail channel of distributing software is via the Internet, e.g., by down loading computer software through web vendors that maintain software websites. Retail Internet software distribution does not work well for low cost software titles in part because the high costs of this distribution medium require that web vendors charge a very large percentage commission on each sale. Like in-store retailers, this causes the profit margins to decrease for low cost software developers and also causes the minimum price of the software to be inflated. Moreover, to use this distribution channel, a user has to have knowledgeable access to the Internet (and complex downloading and electronic unpacking techniques) which can restrict the customer base. Many existing web vendors are, in general, not always user friendly and consumers have difficulties in following installation and administrative instructions required in obtaining the software titles.

The third channel of software distribution involves bundling software with the hardware device itself. While useful for a very small number of applications, this software channel does not provide a wide avenue for mass software distribution, including the distribution of low cost software. The costs associated with bundling software with hardware devices make computer manufacturers very selective in the software they bundle. As a result, only a very small number of software titles are bundled with computer systems, be they desktop systems or PDAs. As a distribution channel, this one only provides a very small outlet for software distribution. Moreover, this distribution channel does not readily provide the software user with a mechanism for obtaining post-sale software upgrades, software fixes, etc.

SUMMARY OF THE INVENTION

Therefore, a need exists to provide a distribution channel for distributing low cost computer software to end users while providing an economic incentive for low cost software developers. Moreover, a need exists for distributing low cost computer software for PDA users.

Accordingly, embodiments of the present invention provide a computer software distribution mechanism that can be used by software developers for distributing low cost computer software. An embodiment of the present) invention provides a user-friendly environment for purchasing or renting computer programs. In one implementation, a computer network is established that includes computer system servers and retail outlets that take the form of automated software dispensing devices, or kiosks, that each resembles an automatic teller machine ("ATM"), hereinafter referred to as a "software ATM" or "software kiosk." Software developers can register their software with the network thereby making it commercially available to each networked software ATM in the vendor's subscriber list.

Due to their locations, the software ATMs are directly available to end users of portable computer systems. Therefore, embodiments of the present invention provide an economically efficient software distribution channel for directly connecting end users with low cost software developers. For instance, the software ATM can be placed in any public location that facilitates the distribution of software and computer services to end users, e.g., in a coffee shop, a mall, a retail store, an airport waiting area, a theatre, near phone booths, in spotting areas, etc. Each remotely located software ATM is connected to a network of computer servers (e.g., via the Internet, or a dedicated network connection) and contains a computer system including a computer screen and a keyboard. Various other equipment for communicating with a PDA are also be provided in each software ATM, such as wireless or slot based communication equipment.

Retail outlets may be motivated to place software ATMs on or near their facilities for a variety of reasons, e.g., to increase foot traffic in the store, or, in return for small rental fees paid to them in exchange for the space occupied by the software ATM. Additionally, retail outlets may, for example, receive a percentage of the the sale or service performed by software ATMs an their property. Furthermore, when the software ATM is not being used to download software or services, it can be used as advertising space for the retail outlet.

Using the software ATM, a user can cause the display of various available programs, and associated prices (and descriptions and ratings), to appear on the computer screen of the software ATM. Optionally, the list can be cataloged by software type (or by any category) and can contain descriptive material regarding each software title, e.g., what it is, how it works, its hardware requirements, and critical software reviews, etc. Selected software titles can be directly installed from the software ATM to the user's portable computer system after paying the required software purchase or rental price. Since the software titles are low priced, payment can be made by cash insertion, or, by a user's credit or debit card. Payment facilities of the software ATM are automated, much in the same way as food, toy or stamp vending machines.

Advantageously, in accordance with one embodiment of the present invention, the user can optionally emulate the functionality of his/her device on the ATM's display screen. A selected application software title can then be emulated on the display screen of the software ATM for testing purposes before the user purchases or rents the computer software. In this way, a user can "try out" the software title before purchasing and installing it on his/her device. In accordance with the present invention, if the user is satisfied with the execution of the selected software on the emulation screen, the user can purchase or rent the selected software using the software ATM.

Still another embodiment of the present invention provides a user with the ability to use the software ATM to receive the latest software upgrade of his/her installed computer software.

Another embodiment of the present invention provides computer services to the user. For instance, the software ATM can be used as a back up mechanism for information stored on the user's portable computer system. For a fee, the user can back up data and programs from his/her portable computer system onto storage servers via the software ATM. This information is then transmitted to one or more of the networked server systems. In this way, a user can restore the data/programs from any remote software ATM that is networked to the server system containing the backed-up data and programs. Should the user's PDA become lost, broken or stolen, a replacement unit can be updated with the user's back-up data and programs from virtually any location providing a software ATM.

In another embodiment of the present invention, the network of software ATMs can be used to warehouse or archive inactive software programs of a portable computer user.

In another embodiment of the present invention, the network of software ATMs can be used as an Internet access point for PDAs which lack wireless Internet capabilities.

More specifically, an embodiment of the present invention is directed to a network system for distributing software programs comprising: a networked server for receiving and storing software programs from software developers; a remotely located software dispensing kiosk networked with the server and for receiving and storing software programs from the networked server; in response to a user request, the software dispensing kiosk for displaying a directory of the software programs; in response to a software selection by a user, the software dispensing kiosk also for accepting payment from the user for a selected software program; and in response to the payment, the software dispensing kiosk for communicating an instantiation of the selected software program to a portable computer system of the user.

Embodiments further include the above and wherein, in response to the software selection, the software dispensing kiosk also for emulating a portable computer system executing the selected software program. Embodiments are also directed to a method of distributing software implemented in accordance with the above.

BRIEF DESCRIPTION OF THE DRAWINGS

FIG. 4 illustrates a screen-displayed directory of computer programs available by a software ATM to a user of a portable computer system.

FIG. 5 illustrates a list of inactive computer programs stored in an archive to save memory space in the electronic device.

FIG. 9 is an illustration of different directories listing rated computer programs.

DETAILED DESCRIPTION OF THE INVENTION

Figure 1:
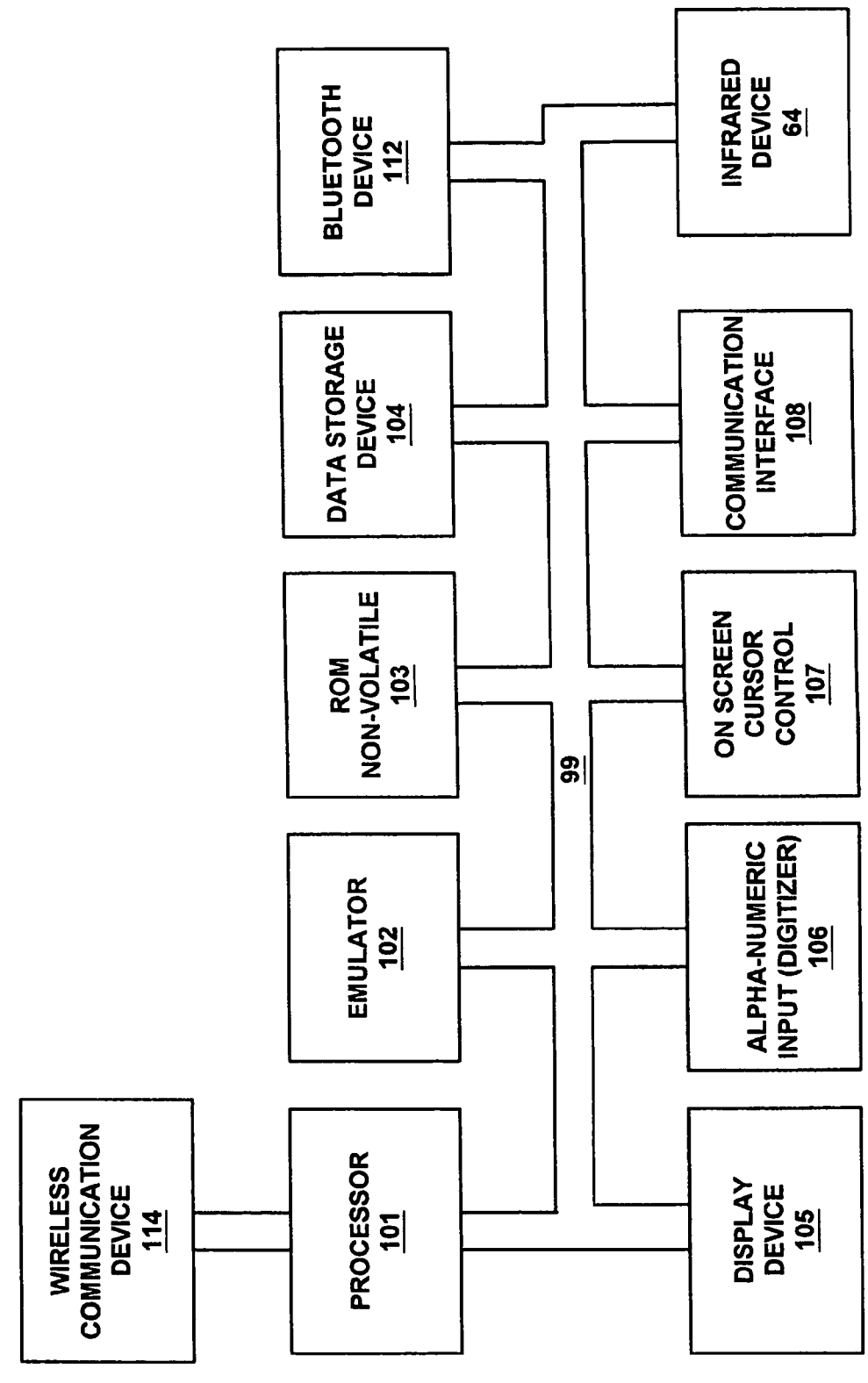
FIG. 1 is a block diagram of an exemplary portable computer system.

Reference will now be made in detail to the preferred embodiments of the present invention, a method and a system for a novel channel of software distribution including the use of remotely located and networked vending machines which are software dispensing kiosks ("software ATMs"), examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or "transmitting" or "beaming" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The present invention is compatible with any electronic device having a wireless or other communication protocol and organized records of information, such as a cell phone or a pager. One of the common types of electronic systems, which can be used in accordance with one embodiment of the present invention, is referred to as a personal digital assistant, or commonly called a PDA. The PDA is a hand held computer system with the capability to store telephone numbers, addresses, daily appointments, and software that maintains business or personal data such as expenses, etc. Furthermore, the PDA also has the ability to connect to a personal computer, enabling the two devices to exchange updated information that is synchronizing the information between the two devices. Additionally, the PDA can also be connected to a modem, enabling it to have electronic mail (e-mail) capabilities over the Internet along with other Internet capabilities. Moreover, an advanced PDA can have Internet capabilities over a wireless communication interface (e.g., radio interface).

FIG. 1 is a block diagram of exemplary circuitry of a portable computing system 330 in accordance with one embodiment of the present invention. The computer system 330 includes an address/data bus 99 for communicating information, a central processor 101 coupled with the bus 99 for processing information and instructions. It is appreciated that central processor unit 101 may be a microprocessor or any other type of processor. The computer system 330 further includes a non-volatile memory '103 (e.g., read only memory, programmable ROM, flash memory, EPROM, EEPROM, etc.) coupled with the bus 99 for storing static information and instructions for the processor 101. Computer system 330 may also include an optional data storage device 104 (e.g., thin profile removable memory) coupled with the bus 99 for storing information and instructions. It should be understood that device 104 may be removable. Furthermore, device 104 may also be a secure digital (SD) card reader or equivalent removable memory reader.

Also included in computer system 330 of FIG. 1 is an alphanumeric input device 106 which in one implementation is a handwriting recognition pad ("digitizer") and may include integrated push buttons in one embodiment. Device 106 can communicate information (spatial data and pressure data) and command selections to the central processor 101.

System 330 of FIG. 1 also includes an optional cursor control or directing device 107 coupled to the bus 99 for communicating user input information and command selections to the central processor 101. In one implementation, device 107 is a touch screen device (also a digitizer) incorporated with display screen 105. Device '107 is capable of registering a position on the screen 105 where the stylus 80 makes contact and the pressure of the contact.

Computer system 330 also contains a flat panel display device 105 coupled to the bus 99 for displaying information to the computer user. The display device 105 utilized with the computer system 330 may be a liquid crystal device (LCD), cathode ray tube (CRT), field emission device (FED, also called flat panel CRT), plasma or other display technology suitable for creating graphic images and/or alphanumeric characters recognizable to the user. In one embodiment, the display 105 is a flat panel multi-mode display capable of both monochrome and color display modes.

Also included in computer system 330 of FIG. 1 is a signal communication device 108 coupled to bus 99 that may be a serial port (or USB port) for enabling system 330 to communicate with a remote device (not shown). As mentioned above, in one embodiment, the communication interface 108 is a serial communication port, but could also alternatively be of any of a number of well known Communication standards and protocols, e.g., parallel, SCSI, Ethernet, FireWire (IEEE 1394), USB, etc. In addition to device 108, wireless communication links can be established between the device 330 and another computer system using a Bluetooth wireless device 1'12, an infrared (IR) device 64, or a Global System for Messaging (GSM) radio device 114. Device 114 may also be a wireless modem device 114, e.g., a GSM wireless radio with supporting chip set.

In one implementation, the Mobitex wireless communication system may be used to provide two way communication between computer system 330 and other networked computers and/or the Internet (e.g., via a proxy server). In other embodiments, transmission control protocol (TCP) can be used or Short Message Service (SMS) can be used. System 330 of FIG. 1 may also contain batteries (not shown) for providing electrical power.

Figure 2:
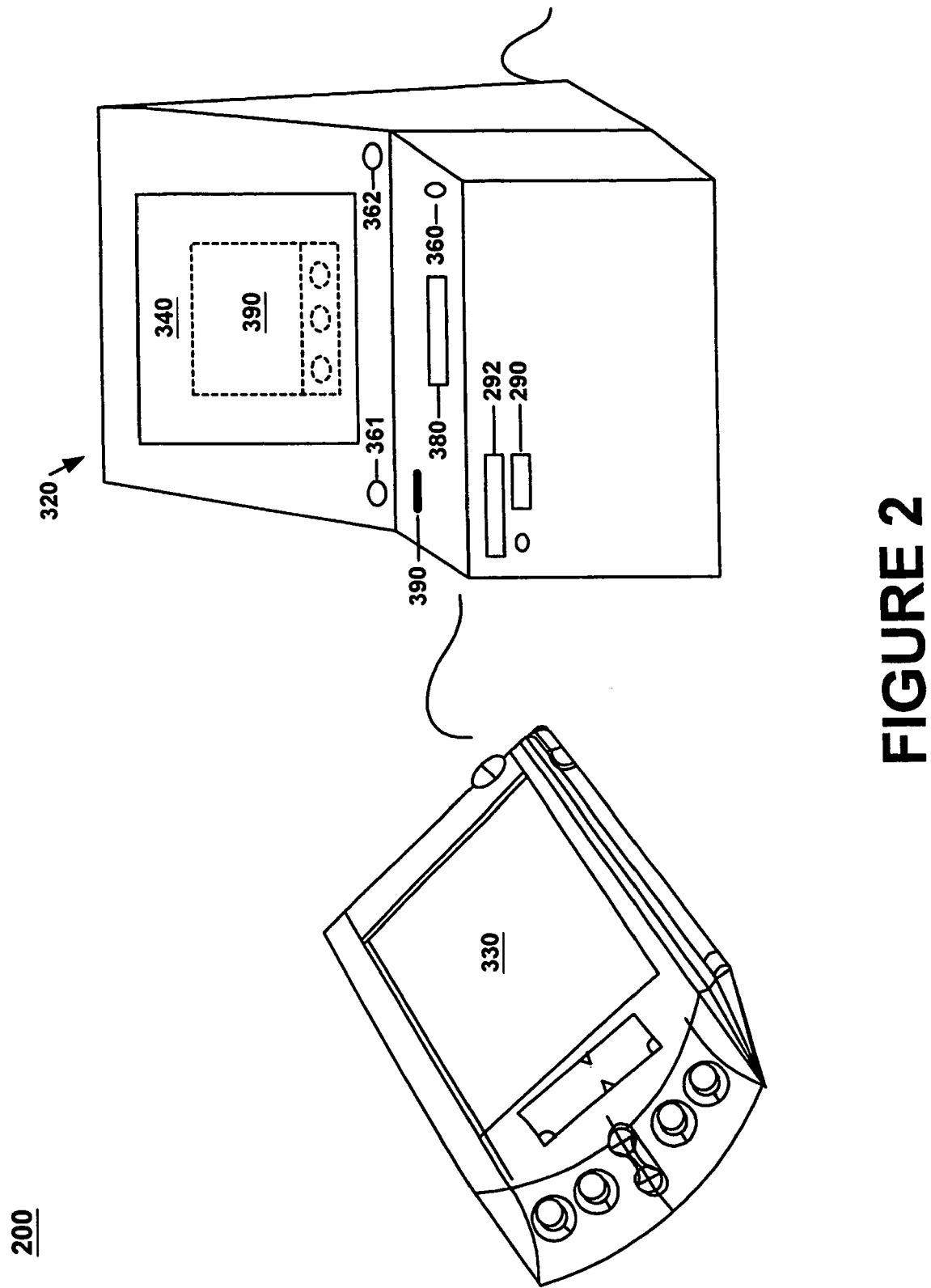
FIG. 2 illustrates a software ATM ("software ATM") capable of dispensing a computer program to an exemplary portable electronic device.

Software Distribution Channel in Accordance with an Embodiment of the Present Invention FIG. 2 depicts a system 200 including a computer software and service dispensing device 320, which is an automated vending machine capable of dispensing computer software to a portable electronic device 330. In one embodiment, the computer software/service dispensing device 320 resembles an automated teller machine (ATM) in appearance and is referred to herein as a "software ATM," a "software kiosk," or a "software dispensing device." However, software dispensing device 320 may be configured in a variety of physical configurations. The portable computer system 330 may be a hand held computer system, e.g., a personal digital assistant (PDA). In one embodiment, software/service dispensing device 320 is a freestanding device. In another embodiment, software dispensing device 320 is coupled (e.g., via the Internet, or a dedicated network connection) with network server computers and other software dispensing devices. Software/service dispensing device 320 includes a general purpose computer system, e.g., a personal computer system, that includes a processor, a display screen, user input devices, and a communication unit for communicating with portable computer system 330. This communication unit can support both contact-based or wireless communication. The software ATM 320 also comprises an operating system. The operating system optionally supports emulation of hand held computer systems, e.g., a Palm OS® Emulator.

The software ATM 320 may be placed in any location that facilitates the selling of software titles offered therein to end users. In one implementation, the software ATM 320 may be placed in a retail market places, coffee shops, airports, near public telephones, etc. The software ATM 320 may be placed at virtually any location where a vending machine would be envisioned.

The software ATM 320 is fully automated in that no human operator is required to conduct a transaction of software titles or software services with an end user. End users may purchase or rent software titles or software services from the software ATM 320 using, for example, a cash transaction or using a credit or debit card. Other methods for consumating the transaction may include E-wallets, gift certificates, or a credit system which awards credits to an end user for each transaction performed using a software ATM. When enough credits have accumulated, the end user is entitled, for example, a free software title download.

Cash transactions may be performed using payment equipment of the software ATM 320 that are analogous to a standard vending machine, e.g., for the purchase of toys, food items or stamps Credit card information may be entered via a keyboard of the software ATM 320, wirelessly by the PDA 330, or via an electronic credit card reader 292 mounted within the software ATM 320.

In operation, a user of portable electronic device 330 can commence a transaction with software ATM 320 either by pointing electronic device 330 at software ATM 320 and requesting a connection wirelessly (e.g., Bluetooth, InfraRed, etc.), or by inserting electronic device 330 onto a cradle 380. During a session, an emulated version 390 of electronic device 330 may appear on touch screen display monitor 340 or upon electronic device 330 if emulation is requested. The user can interact with emulated version 390 of electronic device 330 through electronic device 330, touch screen 340, or by manually manipulating joystick 360 (or other cursor directing device).

Importantly, the user can cause display of a directory of computer software programs, music, or other multimedia software stored in software ATM 230 (e.g., Basketball directory 4'10 of FIG. 4, Games directory 420 of FIG. 4, or stock directory 410 of FIG. 4). The display of the directories can be accomplished either wirelessly with the aid of electronic device 330 or manually by manipulating joy stick 360. In one embodiment, the directory is automatically displayed upon communication with the PDA 330. The directory can include: the name of the software title; a short description of the title; its price; a category; and a ratings (see FIG. 9).

The user can select an application program (e.g., Lakers v Jazz from Basketball directory 410 of FIG. 4, or Solitaire game from Games directory 420 of FIG. 4) either wirelessly or manually, as stated before, and install the selected application program in emulated version 390 of electronic device 330. The user can test run the selected application program on emulated version 390 of electronic device 330. Once the user is satisfied with the operation of the selected application program and decides to purchase or to rent the selected application program, the user may exit the test mode by pressing button 361 or wirelessly via electronic device 330. The user can commence transaction procedures to purchase the application program by pressing button 262, by interacting with buttons generated on touch screen display monitor 340, or wirelessly via electronic device 330. Once purchased, the selected application program can be communicated to the PDA 330, either via contacts from cradle 380, via a wireless communication, or by downloading the software onto a removable data storage device (e.g., data storage device 104 of FIG. 1) inserted into slot 390 of the software ATM. The removable software media may then be inserted into PDA 330 and used to download the software therein.

It is appreciated that the user may conduct payment by inserting cash/coins into the vending slots 290, by sliding a credit card or debit card into card reader 292, via credit card information stored on PDA 330, or by other credit methods such as E-wallet, gift certificates, or credits.

Figure 3:
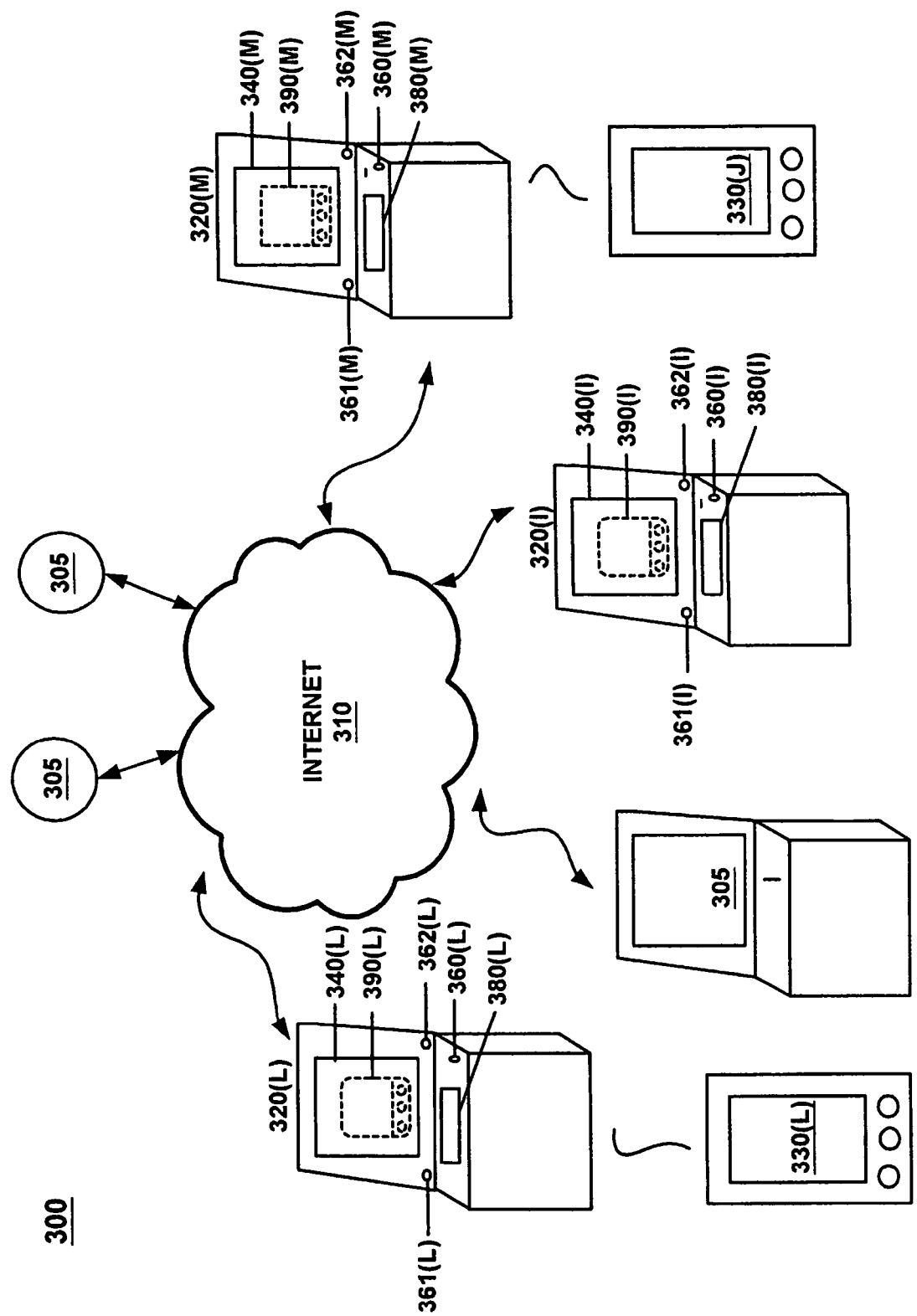
FIG. 3 illustrates a network of remotely located software ATMs networked with sewer systems with each ATM capable of dispensing computer programs to a plurality of portable electronic devices.

FIG. 3 is an illustration of a software distribution network 300 in accordance with an embodiment of the present invention that makes use of the software ATMs 320($i$). The network includes a plurality of networked software ATMs 320($i$) that are coupled (e.g., via the Internet 310, or by a dedicated network connection) to networked server computers 305. The software ATMs 320($i$) are capable of dispensing computer programs to a plurality of portable electronic devices 330($j$). Software ATMs 320($i$), as discussed above, may be installed in a variety of public/retail places (e.g., restaurants, coffee shops, bookstores, airports, retailers, malls, etc.) and accessible to public at large.

Networked server computers 305 regulate the software content of the software ATMs 320($i$) by downloading various software titles to the software ATMs. The networked server computers are responsible for maintaining current versions of software titles that are offered and also for performing other related services, such as providing back-up and archive services (described further below). In one implementation, only the most popular software titles are stored and maintained within the software ATMs. Therefore, a desired software title that is not stored in a particular software ATM can be downloaded to the ATM from a server 305, and then provided to the user.

An owner of electronic device 330(j), who wishes to purchase or rent a computer software program, can use any one of software ATMs 320(i) on the network to access an application program stored in any software ATM 320(m) or application program stored in one of the central archives/servers 305.

A user of electronic device 330(j) can conduct a sales transaction or a rental transaction with any remotely located software ATM 320(i) within the network 300 depending on the location of the two devices. For instance, the user of electronic device 3306) can commence the transaction with software ATM 320(m) by inserting electronic device 330(j) onto cradle 380(m) or by transmitting a "request for connection" signal wirelessly (e.g., Bluetooth, IR, etc) to software ATMs 320(m). In one embodiment, the "request for connection" signal includes the identification number of electronic device 330(j).

Software ATM 320(m) may be a "PC" based device in one embodiment and may include emulator software, e.g., Palm Os @ Emulator. An emulated rendition or animation image 390(m) of electronic device 3306) appears on touch screen display monitor 340(m) if emulation is desired. The user can interact with emulated version 390(m) of electronic device 3306) via electronic device 330(j) either through touch screen 340(m), or joystick 360(m).

Importantly, the user can cause display of a directory of computer software programs (e.g., Basketball directory 410 of FIG. 4, Games directory 420 of FIG. 4, or stock directory 410 of FIG. 4) stored in software ATM 320(m) or stored on archive 395. This directory can be displayed wirelessly through electronic device 330(j) or manually via joy stick 360(m). The directory may be organized by a number of different categories, including the type of software, as shown in FIG. 4. These software titles of the directory are offered for sale by the software ATM.

The user can select one of the displayed application programs from the displayed directory, e.g., Lakers v Jazz from Basketball directory 410 of FIG. 4, Solitaire from games directory 420, etc. The selection may be done wirelessly by using electronic device 330(j) or manually using joy-stick 360(m). The selected program can be installed on emulated version 390(m) of electronic device 3300). Using the optional emulator, the user can conduct a test run of the selected application program on emulated version 390(m) of electronic device 3300) either wirelessly or manually with the aid of joystick 360(m). Once the user is satisfied with the operation of the selected application program and decides to purchase or rent the selected application program, the user may exit the test mode by pressing on button 361(m) or wirelessly via electronic device 3300). The user can download and install the application program on electronic device 330(j) by pressing on button 362(i) or wirelessly using electronic device 330(j) which initiates a purchase transaction which includes the download functionality.

FIG. 4 is an illustration of exemplary software directories that can be displayed on software ATMs 320(m). A plurality of directories can be displayed in accordance to a user's request. A user can select different directories according different on screen menus. Any of the listed titles can be selected by touching the screen of the ATM, using the joystick to navigate an on-screen cursor, or using any number of other well known user interface techniques for selecting screen displayed items. The software directories may reside on software ATM 320(m) at the location (e.g., locally) or on another remote software ATM 320(i) or in the alternative in a remote archive 390 of FIG. 3. The network 300 allows communication between all of these devices.

For example, a user may wish to purchase a chess game software, rent a video game of a basketball game played between Los Angeles Lakers and Utah Jazz and would like to get a report on the XYZ stocks. The user causes Basketball directory 410 to be displayed on emulated version 390 of electronic device 330 of FIG. 2. The user can conduct a test run of the software program, and if satisfied can down load the program on electronic device 330 of FIG. 2.

The user can display software directory 420 of all games available in the to software ATMs 320(i), regardless of where software ATMs 320(i) is physically located. The user can load chess game software on emulated version 390(i) of electronic device 330(j) and perform test runs on the software. The user can rent the software by downloading the software in electronic device 330(j) of FIG. 3.

The user may wish to get a report of the status of XYZ stock. The user can establish communication (e.g., cradle, Bluetooth, IR, etc.) with software ATMs 320(i) and get the report displayed either on his device or on the software ATMs 320(i).

In another embodiment of the present invention, a user of electronic device 330(1) of FIG. 3 can upgrade an already owned computer program. A user of electronic device 330(1) establishes a session with software ATM 320(1) either wirelessly, as explained in FIG. 3, or by inserting electronic device 330(1) onto cradle 380(1). The user then requests software upgrade services, which causes the software titles loaded on the device 330(1) to be recognized by the software ATM. In another embodiment, software ATM determines the software versions running on PDA 330 and asks the user if they want to upgrade their software to a newer version. The software ATM then displays on screen 340(1) a directory of software including the latest versions, if any, of the computer programs that exist on device 330(1). The user can test run the latest version of the software on emulated version 390(1) of electronic device 330(1) by downloading the latest version of the software in the emulated version 390(I) of electronic device 330 (1). If the user is satisfied of the result of the test and decides to replace the old version with the new version, then the user presses button 362(1) to commence a transaction and to download the new version in electronic device 330(1), replacing the old version.

FIG. 5 illustrates a list 610 of inactive computer software programs owned by a user of electronic device 330 of FIG. 2. The user may decide to archive an already owned and less frequently used computer program in an archive provided in accordance to one embodiment of the present invention. The inactive computer software program may be stored in the archive server 305 for future activation. In this embodiment of the present invention, the software ATM may be used to store/access previously purchased but archived software titles of the user. These archived software titles are called "inactive" software titles herein. The user may access any of pre-owned and inactive computer program stored in archive 390 and may download an inactive software title or replace the inactive computer software with a new version of the computer software. The user can activate the inactive program by displaying the list of inactive program 610 and marking the program for activation which causes it to be downloaded from the software ATM into the device.

Figure 6:
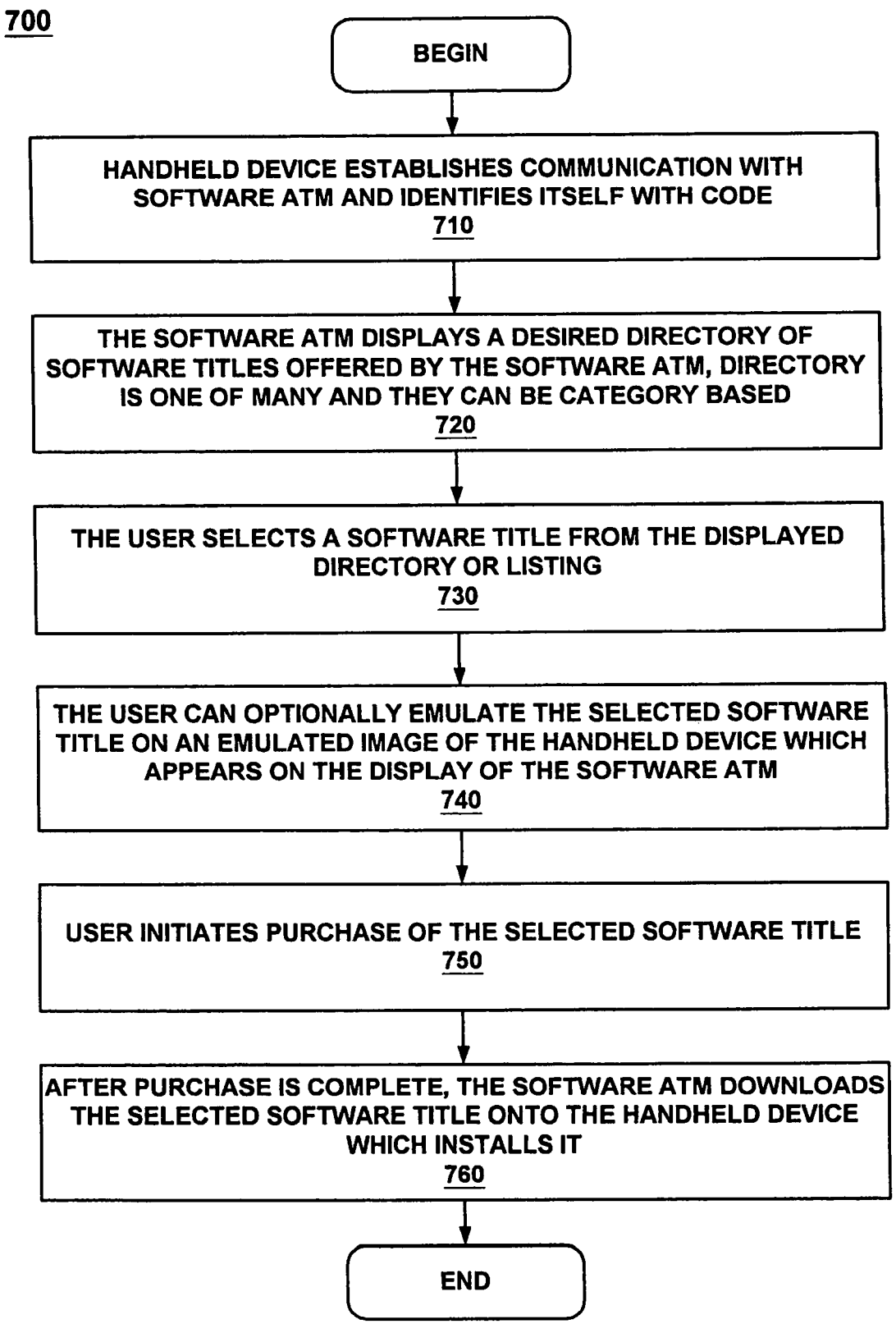
FIG. 6 is a flowchart of steps of a process for dispensing a computer program to a portable electronic device in accordance with one embodiment of the present claimed invention.

FIG. 6 is a flowchart of the steps of a process 700 for purchasing or renting a computer software program from a software ATM, in accordance with one embodiment of the present invention. In step 710, the user establishes a session with the software ATM. In one embodiment, the user starts the session by inserting an electronic device onto a cradle of the software ATM or wirelessly by transmitting "request for connection" signal from the portable electronic device to the software ATM. In another embodiment, the software ATM can detect the presence of the user's electronic device (e.g., via Bluetooth discovery) and initiates a wireless session with the software ATM. Also at step 710, the user identifies the electronic device to the software ATM. The identification is either by inserting the device onto the cradle or an identification number is included in the "request for connection" signal.

In step 720, the user requests display of directories pertaining to his/her interest on the display screen of the software ATM. The directories may be displayed using a menu based system or any user interface that facilitates directory/listing selection. By manipulating the menus, a desired and category-based directory can be displayed. For instance, a user, who is in the market for purchasing computer games, causes a game directory to he displayed on the display screen of software ATM.

In step 730, the user can navigate through the displayed directory in search of a particular computer game of his/her interest which can be selected.

At step 740, the user may optionally have the selected software title emulated on an image of the handheld device that is displayed on the software ATM's display screen.

In step 750, the user can purchase the selected software title if satisfied with the emulation and/or selection. The purchase or rental can be accomplished via credit card or via a cash transaction. In either case, automated transaction equipment of the software ATM can be used. At step 760, the user can download the selected program into the portable computer system after the purchase/rental transaction is complete. Also at step 760, the user can terminate the session and cause the emulated version of the electronic device to disappear by removing the electronic device from the cradle or by sending a signal to software ATM to termination the session.

Figure 7:
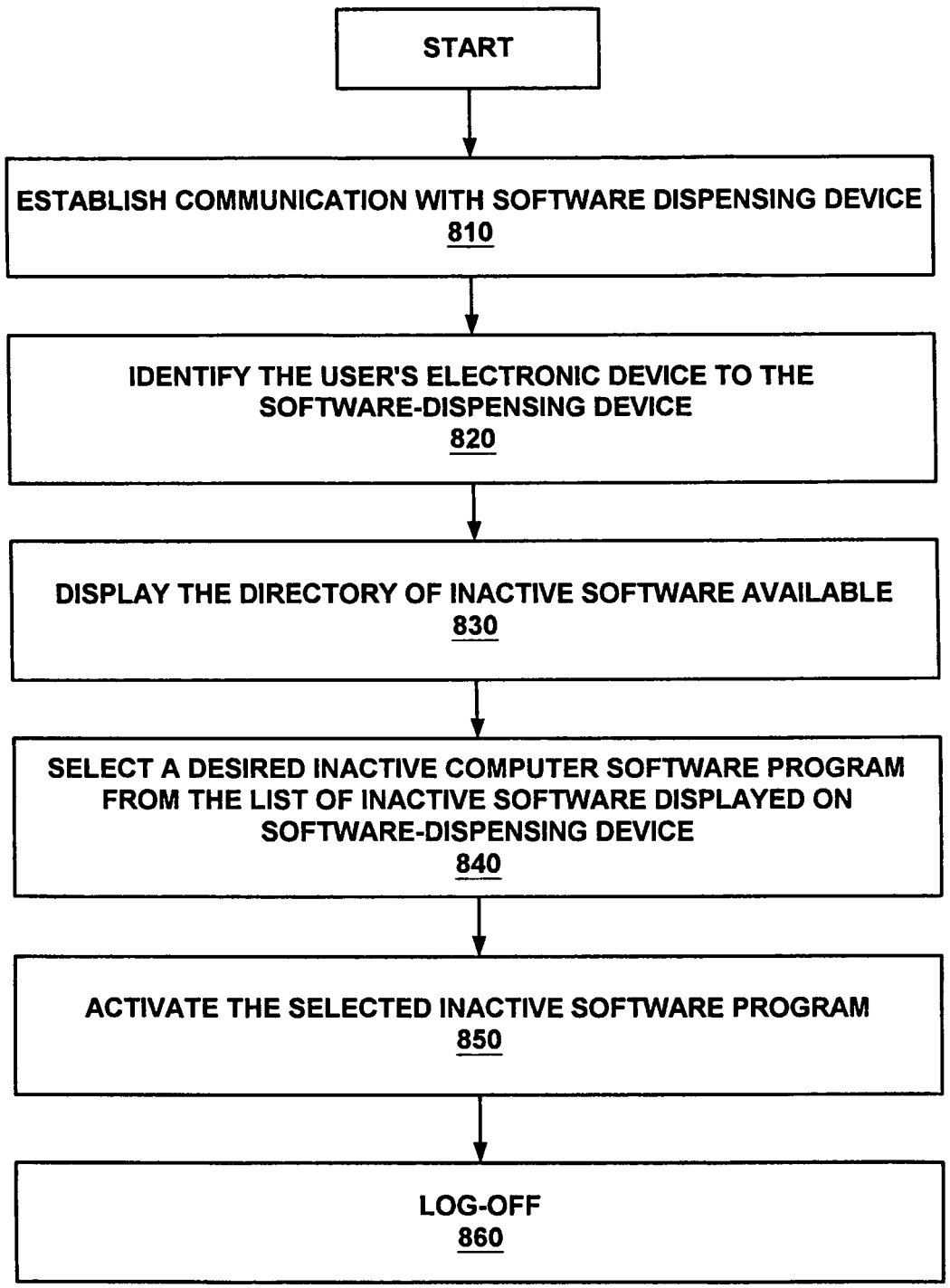
FIG. 7 is a flowchart of steps of a process for activating an inactive computer program from a list of inactive computer programs in accordance with one embodiment of the present claimed invention.

FIG. 7 is a flowchart of steps of a process 800 for using the software ATM to activate, e.g., download, an inactive computer program from a list of inactive computer programs in accordance with one embodiment of the present invention. In this embodiment, the software ATM, and associated network, provides a software archiving service for the user.

In step 810, a user establishes a session with a software ATM. The user may commence the session by inserting an electronic device onto a cradle of the software ATM or wirelessly by transmitting a "requests for connection" signal to the software ATM.

In step 820, the user identifies the electronic device to the software ATM. The identification can be accomplished via a code that is transmitted to the software ATM. The identification may include one or more authentication codes.

In step 830, the user causes the software ATM to display a list of inactive computer programs that are associated with the user's identification code. The inactive programs can be stored in an archive server 305 (FIG. 3). In step 840, the user selects a desired inactive program to be activated from the list of inactive programs.

In step 850, the user activates the inactive program by marking the program "activated. Optionally, this step may require the payment of a fee at the software ATM. This causes the selected program to be downloaded onto the user's portable computer system. In step 860, the user can terminate the session by removing the electronic device from the cradle or by sending a signal to software ATM to termination the session.

Figure 8:
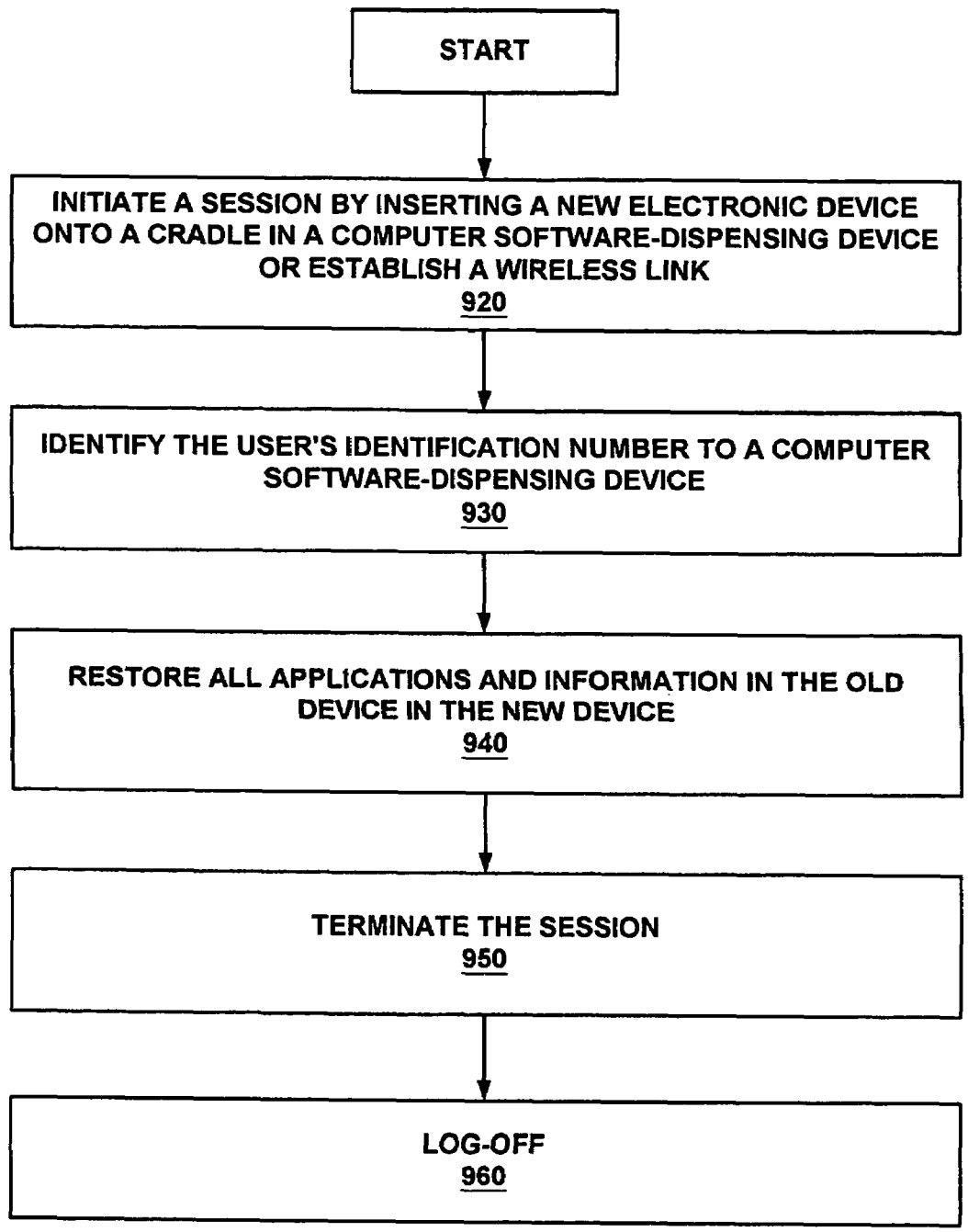
FIG. 8 is a flowchart of the steps of a process for providing a back-up service to a portable electronic device in accordance with one embodiment of the present claimed invention.

FIG. 8 is a flowchart of the steps of a process 900 for restoring previously backed up information from a user's electronic device. The back up data can be restored on a new or replacement device of the user. The previously performed back up procedure can be done using a software ATM. Once backed up, the user's data and/or programs are recorded onto one or more archived servers 305 within the network.

the user's unavailable electronic device into another device. In this embodiment, the software ATM, and associated network, provides a software archiving service for the user.

In step 920, the user establishes a session with the software ATM. The user may start the session by inserting an electronic device onto a cradle or wirelessly by transmitting a "requests for connection" signal to the software ATM.

In step 930, the user identifies an unavailable electronic device (e.g., lost or stolen) to the software ATM. The identification is either by inserting the user's identification number into the software ATM or by swapping a user's special identification card through a slat available in the software ATM.

In step 940, the user commands the software ATM to restore all applications and information existing in the old device into the new device. In step 950, the user terminates the session with the software ATM. In step 960, the user logs-off to erase the user identification number.

FIG. 9 is an illustration of another embodiment of the present invention, where a set 1000 of directories of computer software includes software ratings for each title. Such directory can be available in the network of software ATMs or in a stand-alone software ATM. The stars associated with each entry are an indication of favorable rating by a user of that particular application. The ratings can come from user testimonials, or from critical reviews.

In summary, embodiments of the present invention provide a system and method for a novel channel of software distribution including the use of remotely located and networked vending machines which are software dispensing kiosks ("software ATMs"). According to an embodiment of the present invention a stand alone software dispensing device installed at a public location may be used to commercially dispense computer software to the public. Advantageously, this method of software distribution optionally allows a user of portable computer to emulate a version of his portable computer on the touch screen display of the software ATM and to test run a desired computer software on the emulated version of his computer. The user can purchase the computer program if satisfied with the test result. Another embodiment of this invention allows a plurality of software ATMs to be coupled to the Internet and accessible to the public. Another embodiment of the present invention enables an owner of a portable computer who has lost his portable computer to restore all information in the lost portable computer in a new portable computer.

The foregoing description of specific embodiment of the present invention has been presented for purpose of illustration and description. They are not intended to be exhaustive or to limit the invention to the precise form disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for distributing software programs comprising the steps of:
   transmitting a plurality of software programs from a networked server computer to at least one remote software dispensing device;
   storing said plurality of software programs on said software dispensing device;
   establishing a connection between the software dispensing device and a portable computer system of a user;
   identifying the portable computer system to the software dispensing device, such identification including transmitting an identification code to the software dispensing device from the portable computer system;
   in response to a request from the user, displaying a directory of said plurality of software programs on said software dispensing device;
   in response to software selection, said software dispensing device offering emulation to said user of said software program;
   in response to a software selection by the user, accepting payment from said user for a selected software program; and
   in response to said payment, communicating an instantiation of said selected software program from said software dispensing device to the portable computer system of said user.

2. The method of claim 1, wherein the connection is established wirelessly by the user transmitting a request for connection signal to the software dispensing device from the portable computer system.

3. The method of claim 1, wherein the connection is established wirelessly by the software dispensing device discovering the presence of the portable computer system.

4. The method of claim 1, wherein the connection is established by the user placing the portable computer system onto a cradle attached to the software dispensing device.

5. The method of claim 1, wherein the portable computer system is identified to the software dispensing device by the user placing the portable computer system onto a cradle attached to the software dispensing device.

6. The method of claim 1, wherein the portable computer system is identified to the software dispensing device by means of an identification code wirelessly transmitted to the software dispensing device from the portable computer system.

7. The method of claim 1, wherein the directory comprises a name, description, price, category and rating for each of said plurality of software programs.

8. The method of claim 1, wherein the directory resides on a device remote from the software dispensing device.

9. The method of claim 1, wherein the software dispensing device recognizes a software program previously loaded onto the portable computer system and asks the user if he or she wishes to upgrade the previously-loaded software program to a newer version.

10. A network system for distributing software programs comprising:
    a networked server for receiving and storing software programs from software developers;
    at least one remotely located software dispensing kiosk networked with said server and configured for receiving and storing software programs from said networked server, for establishing a connection with a portable computer system of a user, and for identifying the portable computer system, wherein the identification includes transmitting an identification code to the software dispensing kiosk;
    in response to a request from the user, said software dispensing kiosk displaying a directory of said software programs;
    in response to software selection, said software dispensing kiosk offering emulation of said software program;
    in response to a software selection by a user, said software dispensing kiosk accepting payment from said user for a selected software program; and
    in response to said payment, said software dispensing kiosk communicating an instantiation of said selected software program to a portable computer system of said user.

11. The network system of claim 10, wherein said software dispensing kiosk comprises:
    a processor coupled to a bus;
    a memory coupled to said bus;
    a display screen coupled to said bus; and
    a communication unit coupled to said bus and for communicating with said portable computer system of said user.

12. The network system of claim 10, wherein the connection is established wirelessly by the user transmitting a request for connection signal to the software dispensing kiosk from the portable computer system.

13. The network system of claim 10, wherein the connection is established wirelessly by the software dispensing kiosk discovering the presence of the portable computer system.

14. The network system of claim 10, wherein the connection is established by the user placing the portable computer system onto a cradle attached to the software dispensing kiosk.

15. The network system of claim 10, wherein the portable computer system is identified to the software dispensing kiosk by the user placing the portable computer system onto a cradle attached to the software dispensing kiosk.

16. The network system of claim 10, wherein the portable computer system is identified to the software dispensing kiosk by means of an identification code wirelessly transmitted to the software dispensing kiosk from the portable computer system.

17. The network system of claim 10, wherein the directory comprises a name, description, price, category and rating for each of said plurality of software programs.

18. The network system of claim 10, wherein the directory resides on a device remote from the software dispensing kiosk.

19. The network system of claim 10, wherein the software dispensing kiosk recognizes a software program previously loaded onto the portable computer system and asks the user if he or she wishes to upgrade the previously-loaded software program to a newer version.

* * * * *

UNITED STATES PATENT AND TRADEMARK OFFICE
CERTIFICATE OF CORRECTION

| | | |
|---|---|---|
| PATENT NO. | : 7,664,679 B2 | Page 1 of 1 |
| APPLICATION NO. | : 11/257767 | |
| DATED | : February 16, 2010 | |
| INVENTOR(S) | : Stefanik et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 742 days.

Signed and Sealed this

Thirtieth Day of November, 2010

David J. Kappos
*Director of the United States Patent and Trademark Office*